United States Patent [19]

Baud

[11] 4,254,334
[45] Mar. 3, 1981

[54] INCLINOMETER

[75] Inventor: Raoul Baud, Vevey, Switzerland

[73] Assignee: Siemens-Albis, Zurich, Switzerland

[21] Appl. No.: 6,477

[22] Filed: Jan. 24, 1979

[30] Foreign Application Priority Data

Feb. 6, 1978 [CH] Switzerland ............... 1264/78

[51] Int. Cl.³ .................................... G01C 9/00
[52] U.S. Cl. ........................... 250/231 R; 250/577
[58] Field of Search ............. 33/366; 250/231 R, 577

[56] References Cited

U.S. PATENT DOCUMENTS

| 3,388,258 | 6/1968 | Grant | 250/577 |
| 3,817,625 | 6/1974 | Jordan | 250/577 X |
| 3,863,067 | 1/1975 | Gooley | 33/366 X |
| 4,110,609 | 8/1978 | Beer | 33/366 X |

Primary Examiner—David C. Nelms
Assistant Examiner—Darwin R. Hostetter
Attorney, Agent, or Firm—Werner W. Kleeman

[57] ABSTRACT

An inclinometer is proposed wherein the degree and the orientation of the inclination of an apparatus, such as a vehicle or crane, relative to an artificial horizon can be measured and monitored by means of light barriers. This inclinometer comprises an annular vessel having light-transmissive walls and a hollow ring cover which partially embraces the annular vessel. The inner walls and outer walls of the hollow ring cover are provided with light sources and light receivers which are arranged opposite one another in pairs so as to form light barriers which penetrate the annular vessel and can be interrupted by a liquid contained in such vessel.

12 Claims, 2 Drawing Figures

INCLINOMETER

BACKGROUND OF THE INVENTION

The present invention relates to a new and improved inclinometer in which light barriers are used to measure and monitor an inclination relative to an artificial horizon which is determined by the mirror plane of a liquid contained in a vessel and wherein a deviation exceeding an adjustable quantity in the position of a reference plane of the inclinometer relative to the artificial horizon triggers an alarm.

An inclinometer of this kind serves, for example, to warn a vehicle driver of the danger of his or her vehicle overturning when travelling over hilly terrain. Inclinometers designed as overturning warning devices which comprise a U-shaped vessel partially filled with liquid are in fact known to the art. For example, the French application No. 74 06386 describes an overturning warning device of this type comprising two floats. Such overturning warning device responds relatively well in the event of a tilting movement in the plane which contains the U-shaped vessel, but is insufficiently accurate in the case of tilting movements in other planes.

SUMMARY OF THE INVENTION

It is a primary object of the present invention to provide an inclinometer which responds well in the event of a tilting movement in any vertical plane and which can also be used in crane apparatus. Under the term "crane apparatus" there should be understood crane vehicles and crane devices of all types, such as crane trucks, lifting trucks, rotary tower trucks or cranes and so forth.

A further object of the present invention consists in enabling the degree and/or the orientation of the inclination of a vehicle to be objectively evaluated.

The inclinometer in accordance with the invention is manifested by the features that the vessel is an annular vessel which possesses walls which are at least partially light-transmissive and which, in respect of its axis of symmetry, is aligned at least approximately at right angles to the reference plane of the inclinometer. The interior of the annular vessel is only partially filled with an at least approximately opaque or light impervious, viscous liquid. A hollow ring cover is provided which partially embraces the annular vessel and whose inner walls and outer walls are provided with light sources and light receivers arranged opposite one another in such manner as to form light barriers which penetrate the annular vessel and can be interrupted by the liquid.

An inclinometer of this type advantageously responds in the event of tilting movements in any arbitrary vertical plane.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
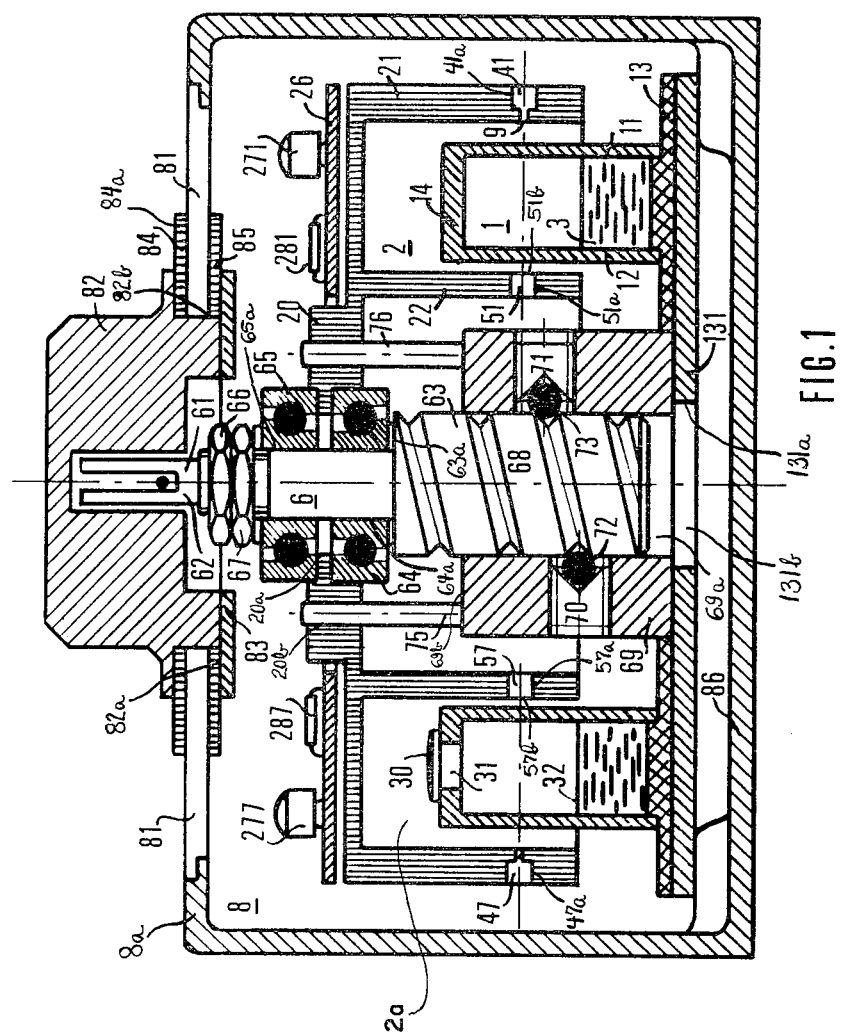
FIG. 1 illustrates a first embodiment of an inclinometer in sectional view.

The inclinometer shown in FIG. 1 comprises an hermetically sealable annular vessel 1 equipped with a matching, open hollow ring cover 2. The annular vessel 1 contains substantially cylindrical outer walls 11, substantially cylindrical inner walls 12, a base disc 13 and a cover ring 14. Such annular vessel 1 has, for instance, a substantially rectangular cross-section in axial direction, and the base disc 13 is securely mounted on a base plate 131. The cylindrical walls 11 and 12 of the annular vessel 1, which can be preferably circular, are radiation-transparent. The annular vessel 1 is partially filled with a liquid 3 which is not radiation-transparent. The hollow ring cover 2 possesses a carrier or support plate 20 with which there are concentrically connected, at substantially right angles to itself, essentially cylindrical outer walls 21 and essentially cylindrical inner walls 22 between which the annular or ring-shaped vessel 1 can be inserted.

To facilitate the formation of a light barrier, the outer and inner walls 21, 22 of the hollow ring cover 2 are provided at various points with bores 41a, 47a and 51a, 57a or the like arranged in pairs or groups, so that radiation can pass, for example, through bore 41a in the outer wall 21 of the hollow ring cover 2, through the two radiation-transparent walls 11 and 12 of the annular vessel 1, and through the bore 51a of the inner wall 22 of the hollow ring cover 2, or in the reverse direction.

The various light barriers 41, 51 and 47, 57 are formed by providing, preferably in each case in a suitable fixture or mounting, a suitable light source 51 and 57, for instance a respective semiconductor diode which is accommodated in one related bore, for example bore 51a, and emits infrared light and an infrared light receiver 41 and 47, preferably a photo-transistor, which is accommodated in the opposite situated bore, for example the light receiver 41 arranged in the bore 41a, and is aligned towards the infrared light emitted from the associated semiconductor diode. Diodes which emit normal light or other light sources can of course also be used for this purpose. The light sources 51 and 57 can be provided with suitable focusing means, typically optical lenses, generally indicated by reference characters 51b and 57b, provided in the selected bores 51a and 57a.

The inclinometer illustrated in FIG. 1 possesses a number n of different light barriers 1, 2, ... n which are offset from one another at least approximately an an angle α=360/n and which penetrate that part of the interior of the annular vessel 1 which is free of liquid, and each of which additionally extends at least approximately at right angles to the axis of symmetry of the annular vessel 1. For example with n=12 light barriers, twelve bores are required on the outer wall 21 and twelve bores on the inner wall 22 of the hollow ring cover 2.

On the hollow ring cover 2 of the inclinometer there is secured a printed circuit 26 on which there can be mounted indicator lamps 271 ... 277 and the usual components 281 ... 287 required for controlling the light barriers 41, 51 and 47, 57. One or several indicator lamps can be provided for each light barrier. In FIG. 1 only two of these indicator lamps 271, 277 and these components 281, 287 have been shown.

The hollow ring cover 2 and the annular vessel 1 illustrated in FIG. 1 are connected to a fixing or adjustment mechanism 6 by means of which the annular vessel 1 is held at a greater or lesser depth inside the cavity or compartment 2a of the hollow ring cover 2 and by means of which it is possible to adjust the penetration depth of the annular vessel 1.

This fixing or adjustment mechanism 6 comprises a spindle 61 composed of a spindle collar 62 which is partially provided with a thread and a spindle body 63 having a larger diameter than the spindle collar 62. The spindle collar 62 of the spindle 61 penetrates through the bearing bore 64a of a first ball bearing 64, through a bore 20a of the carrier or support plate 20 and through the bearing bore 65a of a second ball bearing 65 which is pressed by means of two nuts 66 and 67 or equivalent structure against the end edge surface or face 63a of the spindle body 63. The spindle body 63 is provided with a screw-like or notch-like groove 68 and is slidingly arranged within an inner cavity or compartment 69a of a substantially cylindrical ring element 69. This ring element 69 possesses two radial bores 70 and 71 which are displaced relative to one another in the longitudinal direction of the ring element 69 by half the screw thread or pitch of the groove 68 and each bore 70 and 71 serves to press a ball 72 and 73, respectively, against the groove 68. The ring element 69 is firmly connected to the base plate 131 of the annular vessel 1. This base plate 131 is of annular or ring-like formation and possesses an inner diameter 131a which is somewhat greater than the outer diameter of the spindle body 63; this allows the spindle 61 to project from the ring element 69 beneath the base plate 131.

The inclinometer illustrated in FIG. 1 also comprises two guide rods 75 and 76 which are arranged at essentially right angles to the upper end surface or face 69b of the ring element 69 and are firmly connected thereto. These guide rods 75 and 76 slide into corresponding bores 20b of the carrier plate 20 and allow the hollow ring cover 2 to only move in the longitudinal direction.

The embodiment of inclinometer illustrated in FIG. 1 is additionally provided with a substantially cylindrical housing 8 on whose upper end surface 8a there is mounted a window which consists of a transparent annular disc 81 through which there is visible at least the light of the lit indicator lamps 271 . . . 277. The spindle 61 can be rotated with the aid of a suitable rotational device, such as the shown rotary knob 82. The lower end face 82a of the rotary knob 82 is connected to a support or mounting plate 83. An annular disc 84 marked with a scale, generally indicated by reference character 84a, is inserted between the corner edge 82b of the rotary knob 82 and the transparent annular disc 81. To simplify the calibration, the annular disc 84 is fixedly connected to the transparent annular disc 81 at a suitable point. The rotary knob 82 is provided with a suitable mark or pointer (not shown) which indicates the inclination range of the inclinometer on the scale 84a. A further annular disc 85 can be freely rotated between the friction surfaces of the transparent annular disc 81 and the support plate 83. The base plate 131 of the annular vessel 1 is arranged so as to be somewhat superimposed over the base 86 of the cylindrical housing 8 in order to allow movement of the spindle 61 through the inner bore 131b of the base plate 131. The annular vessel 1 possesses an opening or port 31 which is provided with a cover 30 or the like and which permits filling of the liquid 3.

The inclinometer illustrated in FIG. 1 and described above functions as follows:

The inclinator is secured on or to a vehicle in such a manner that the axis of symmetry of the annular vessel 1 runs at least approximately at right angles to the path of the vehicle or to the operating plane of the crane apparatus or the like. The liquid level 32 is thus always disposed at right angles to the walls 11 and 12 of the annular vessel 1 and to the walls 21 and 22 of the hollow ring cover 2 when the vehicle is on a horizontal surface. The liquid level 32 is monitored by the various light barriers, such as light barriers 41, 51 and 47, 57, so that in the event of a lateral inclination of the vehicle, this is indicated at least by one indicator lamp 271 . . . 277, and the degree and/or orientation of the particular inclination is given by the number and positions of the indicator lamps which respond to the inclination. The response of the indicator lamps can be indicated by the lamps either switching on or off. At the same time as soon as an indicator lamp extinguishes an alarm can be triggered. The sensitivity of this inclinometer can be modified by means of the rotary knob 82, since when the latter is rotated the hollow ring cover 2 is caused to move in the axial direction as a result of which the distance between the light beam of each shown light barrier 41, 51 and 47,57 and the liquid level 32 is adjusted.

By means of a constructional measure the inclinometer also can have imparted thereto greater sensitivity in that a narrow slot 9, centered with respect to the bores 41 . . . 47, is provided around the inside of the outer wall 21 of the hollow ring cover 2. Such type slot 9 enables the light to be received in a narrow angle of scatter. However, since the slot is of continuous width all along the horizontal plane, a larger quantity of light is received than if bores having the same diameter are provided.

An inclinometer of the described construction advantageously allows the levelling of crane apparatus in all directions with the aid of the n indicator lamps. When levelling has been completed, a suitable circuit can switch off the n indicator lamps by means of a switch and in the event of a danger of tilting can actuate alarms and/or safety controls.

This inclinometer also has the advantage of responding irrespective of the origin of the danger of tilting which, for example, can be due to a dip in the ground and/or wind influence and/or load influence.

Figure 2:
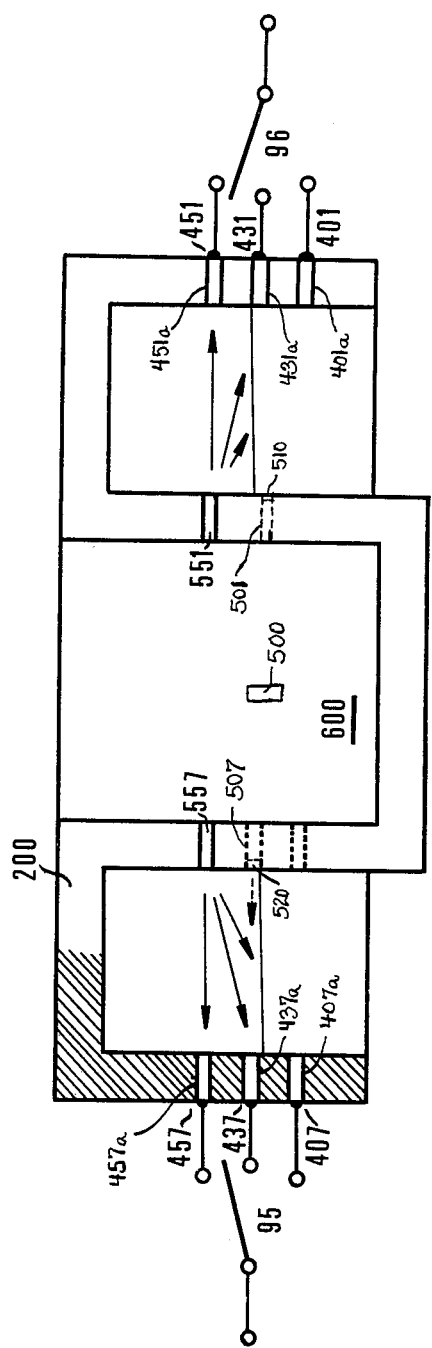
FIG. 2 shows details of a further embodiment.

In the inclinometer illustrated in FIG. 1 the light receivers 41 . . . 47 are accommodated in one single plane. However, it is also possible to distribute the light receivers between a plurality of planes 401 . . . 407, 431 . . . 437, 451 . . . 457 . . . which are aligned at essentially right angles to the axis of symmetry of the hollow ring cover 200, as shown in FIG. 2. In such circumstances, the light receivers 407a, 437a, 457a and 401a, 431a, 451a, can be switched-on, for example by using the respective switches 95 and 96, as required, either individually or in planes or in groups in accordance with the function of the orientation of the inclinometer. It can be adequate to use light transmitters 551 . . . 557 arranged in only one plane. An arrangement of this type has the advantage that the fixing or adjustment mechanism can be simplified or entirely dispensed with since the response sensitivity can be adjusted electrically instead of mechanically.

With the embodiment of inclinometer as illustrated in FIG. 2 the fixing mechanism can be simplified in that it is constructed, for example, by using only a few screws and at least one positioning base. This provides sufficient space in order to arrange at least one light source, for example an incandescent lamp, in the central interior compartment or chamber 600 at the region of the axis of the hollow ring cover 200. Such light source has been schematically indicated in FIG. 2 by reference character 500. In this case, if the hollow ring cover 200 or at least its inner wall does not already consist of light-transmissive material, the inner wall of the hollow ring cover is provided with openings, such as for example indicated by reference characters 501 . . . 507, through which the light emitted from the light source 500 can reach the light receivers 401a . . . 407a, 431a . . . 437a, 451a . . . 457a arranged at the outer wall of the hollow ring cover 200. When there is one single central light source and the inner walls are at least partially non-transmissive to light, these opening can also run obliquely in the inner walls of the hollow ring cover, i.e., in the direction from the light source to the light receivers. Focusing elements or light conductors can be additionally arranged on or in these openings and, if desired, can be inserted until they reach the light source in order to enable the use of a very low power light source. Such focusing elements, typically lenses, have been merely schematically indicated for the openings 501 . . . 507 by reference characters 510 . . . 520.

While there are shown and described present preferred embodiments of the invention, it is to be distinctly understood that the invention is not limited thereof, but may be otherwise variously embodied and practiced within the scope of the following claims. ACCORDINGLY,

What I claim is:

1. In an inclinometer wherein light barriers are used to measure and monitor an inclincation relative to an artificial horizon which is determined by the specular plane of a liquid contained in a vessel, and wherein a deviation, exceeding an adjustable quantity, in the position of a reference plane of the inclinometer relative to the artificial horizon is capable of triggering an alarm, the improvement which comprises:
   said vessel comprising a substantially annular vessel possessing at least partially light-transmissive walls;
   said annular vessel possessing an axis of symmetry;
   said annular vessel being aligned, with respect to said axis of symmetry, at least approximately at right angles to the reference plane of the inclinometer;
   said annular vessel having an internal substantially ring-shaped compartment which is only partially filled with the liquid;
   said liquid comprising an at least approximately light impervious, viscous; and
   the level of the liquid in the ring-shaped compartment being used for the measuring and monitoring of inclinations.

2. The improvement as defined in claim 1, further including:
   a hollow ring cover which at least partially encloses the annular vessel.

3. The improvement as defined in claim 2, wherein:
   said hollow ring cover surrounds the annular vessel but only extends over part of the height thereof.

4. The improvement as defined in claim 2, wherein:
   said hollow ring cover has an inner wall means and an outer wall means;
   one of said wall means being provided with light sources and the other of said wall means with light receivers which are arranged opposite one another in pairs so as to form light barriers which penetrate the annular vessel and can be interrupted by the liquid.

5. The improvement as defined in claim 2, wherein:
   said hollow ring cover has an essentially central internal compartment;
   a light source arranged at said central internal compartment;
   said central internal compartment being bounded by an inner wall containing at least one light-transmissive opening; and
   said hollow ring cover including an outer wall containing light receivers which are arranged to coact with said light source so as to form said light barriers which penetrate the annular vessel and can be interrupted by the liquid.

6. The improvement as defined in claim 5, wherein:
   said at least one light-transmissive opening being provided with focusing means for the beam path emanating from the light source.

7. The improvement as defined in claim 4, wherein:
   said light receivers are distributively arranged between a plurality of planes aligned essentially at right angles to the axis of symmetry of the hollow ring cover; and
   switch means for interrogating in groups said light receivers.

8. The improvement as defined in claim 4, wherein:
   said hollow ring cover possesses a carrier plate having a substantially cylindrical outer wall defining said outer wall means;
   said substantially cylindrical outer wall extending essentially at right angles with respect to said carrier plate;
   said carrier plate possessing an inner wall defining said inner wall means; and
   said substantially cylindrical inner wall extending concentrically with respect to said substantially cylindrical outer wall;
   said annular vessel being partially enclosed by said inner and outer walls.

9. The improvement as defined in claim 4, wherein:
   there being provided n-number of said light barriers which are angularly offset from one another at least approximately at an angle $\alpha = 360/n$ and arranged essentially at right angles with respect to the axis of symmetry of the hollow ring cover.

10. The improvement as defined in claim 4, further including:
    an optical indicator element provided for each individual light barrier;
    said indicator elements being fixed on said hollow ring cover in offset relationship from one another at least approximately at an angle $\alpha = 360/n$, wherein n represents the number of said optical indicator elements.

11. The improvement as defined in claim 2, further including:
    means for mounting said hollow ring cover to be axially displaceable relative to said annular vessel and for fixing said hollow ring cover in desired position.

12. The improvement as defined in claim 4, wherein:
    said hollow ring cover is provided with slot means at the inside of said outer wall means for limiting the angle of scatter of the light received by the light receivers, in order to thereby increase the response sensitivity of the inclinometer.

* * * * *